Figure 1:
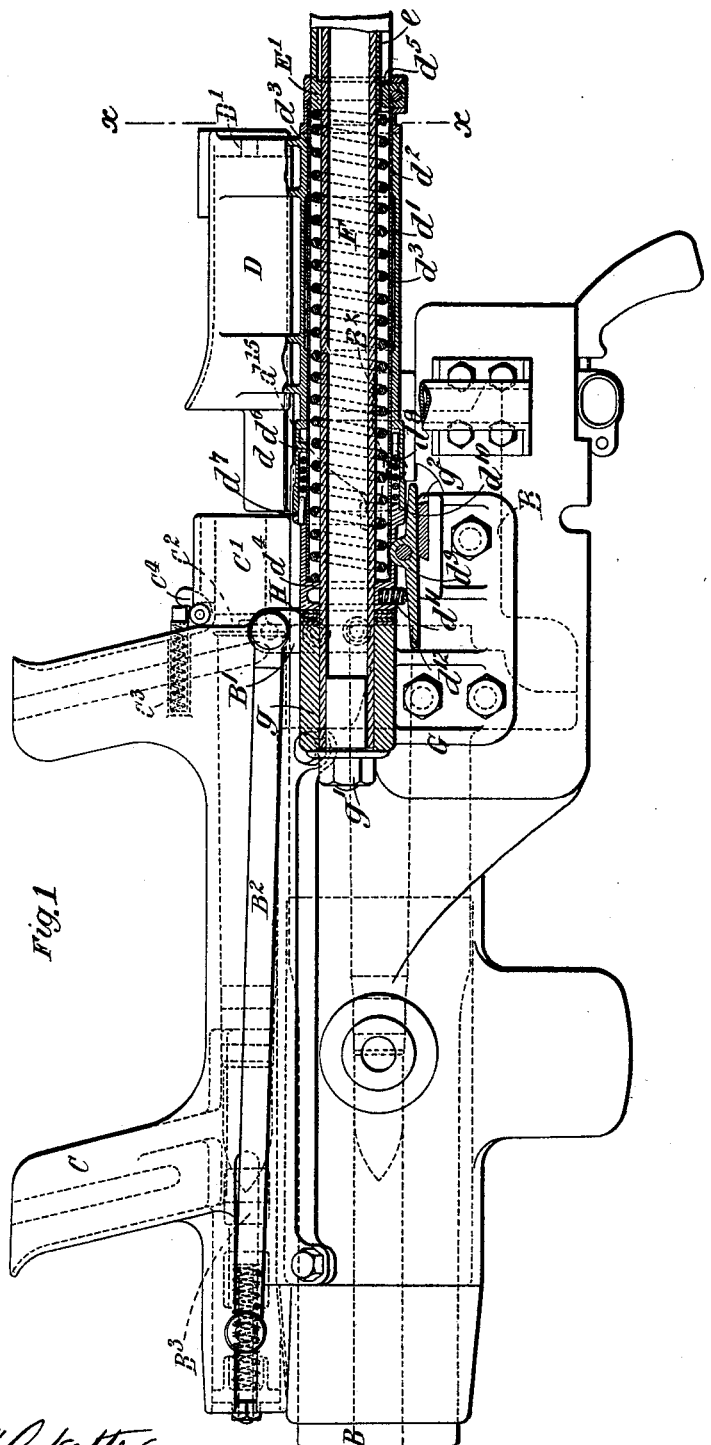

(No Model.)  14 Sheets—Sheet 1.

H. S. MAXIM.
AUTOMATIC GUN.

No. 593,228.  Patented Nov. 9, 1897.

Witnesses:
Raphael Netter
Benjamin Miller

Hiram S. Maxim, Inventor
by Kerr, Curtis & Page, Attys.

THE NORRIS PETERS CO., PHOTO-LITHO., WASHINGTON, D. C.

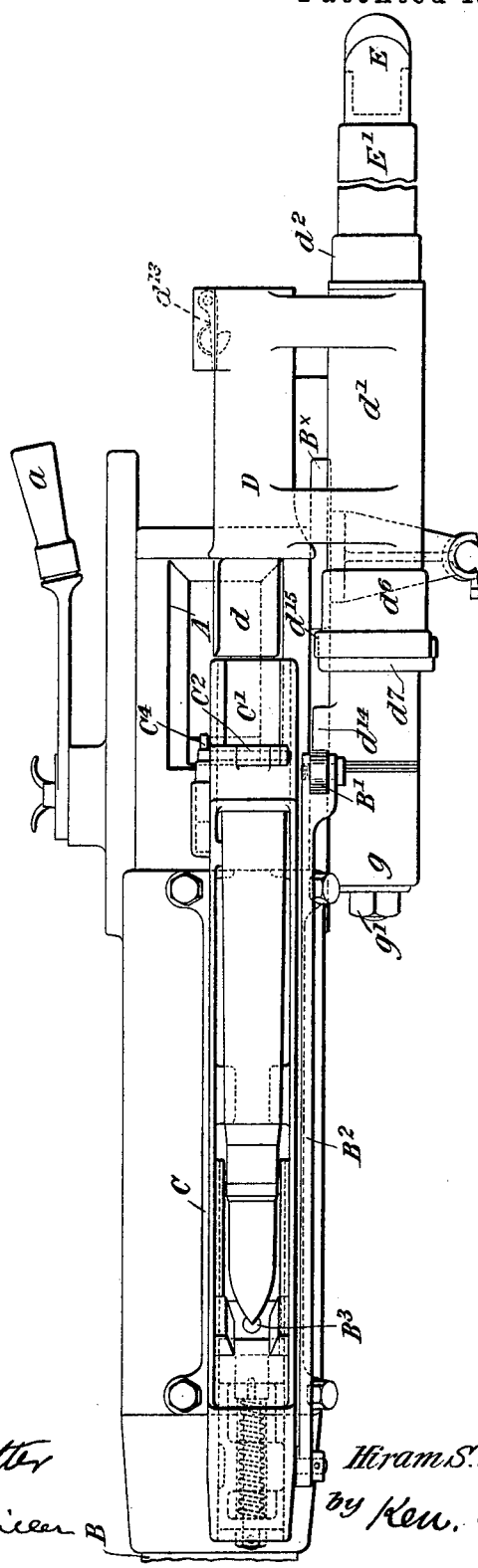

(No Model.)  14 Sheets—Sheet 3.
H. S. MAXIM.
AUTOMATIC GUN.
No. 593,228.  Patented Nov. 9, 1897.
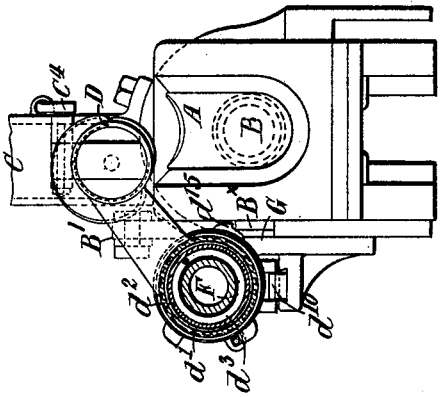
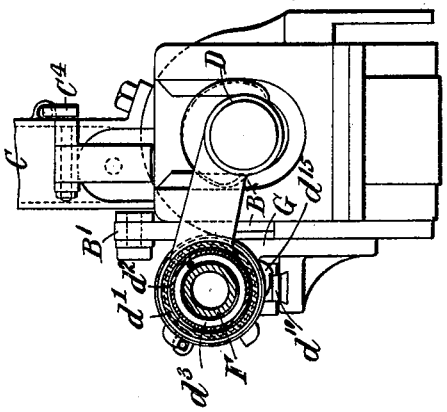
Witnesses:
Raphael Netter
Benjamin Miller
Hiram S. Maxim, Inventor
by Ken. Curtis & Page. Att'ys (No Model.) 14 Sheets—Sheet 4.
H. S. MAXIM.
AUTOMATIC GUN.
No. 593,228. Patented Nov. 9, 1897.
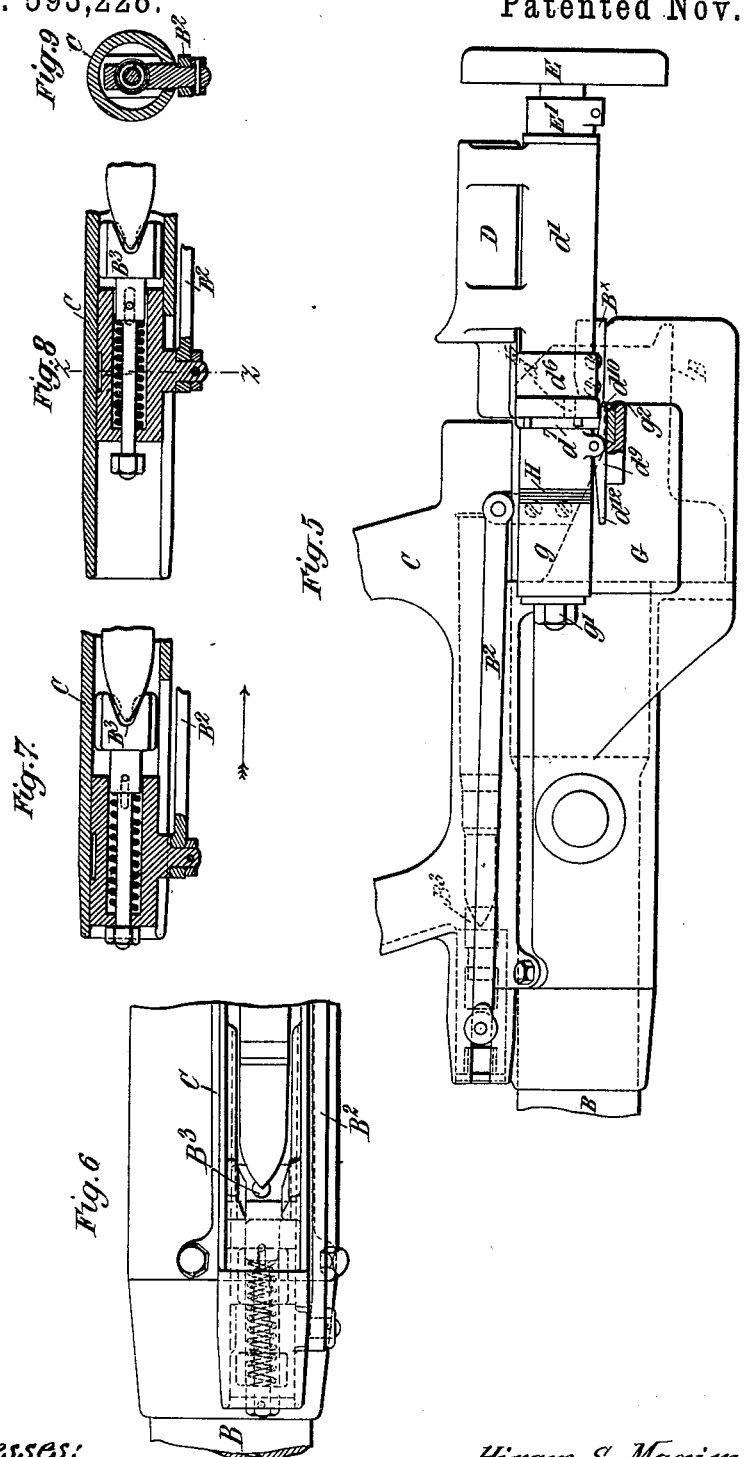
Witnesses:
Raphaël Netter
Benjamin Meisser
Hiram S. Maxim, Inventor
by Kerr, Curtis & Page, Att'ys.

(No Model.) 14 Sheets—Sheet 5.
H. S. MAXIM.
AUTOMATIC GUN.

No. 593,228. Patented Nov. 9, 1897.

Witnesses: Hiram S. Maxim, Inventor
Raphael Netter
Benjamin Miller by Kerr, Curtis & Page, Att'ys (No Model.) 14 Sheets—Sheet 6.
H. S. MAXIM.
AUTOMATIC GUN.
No. 593,228. Patented Nov. 9, 1897.
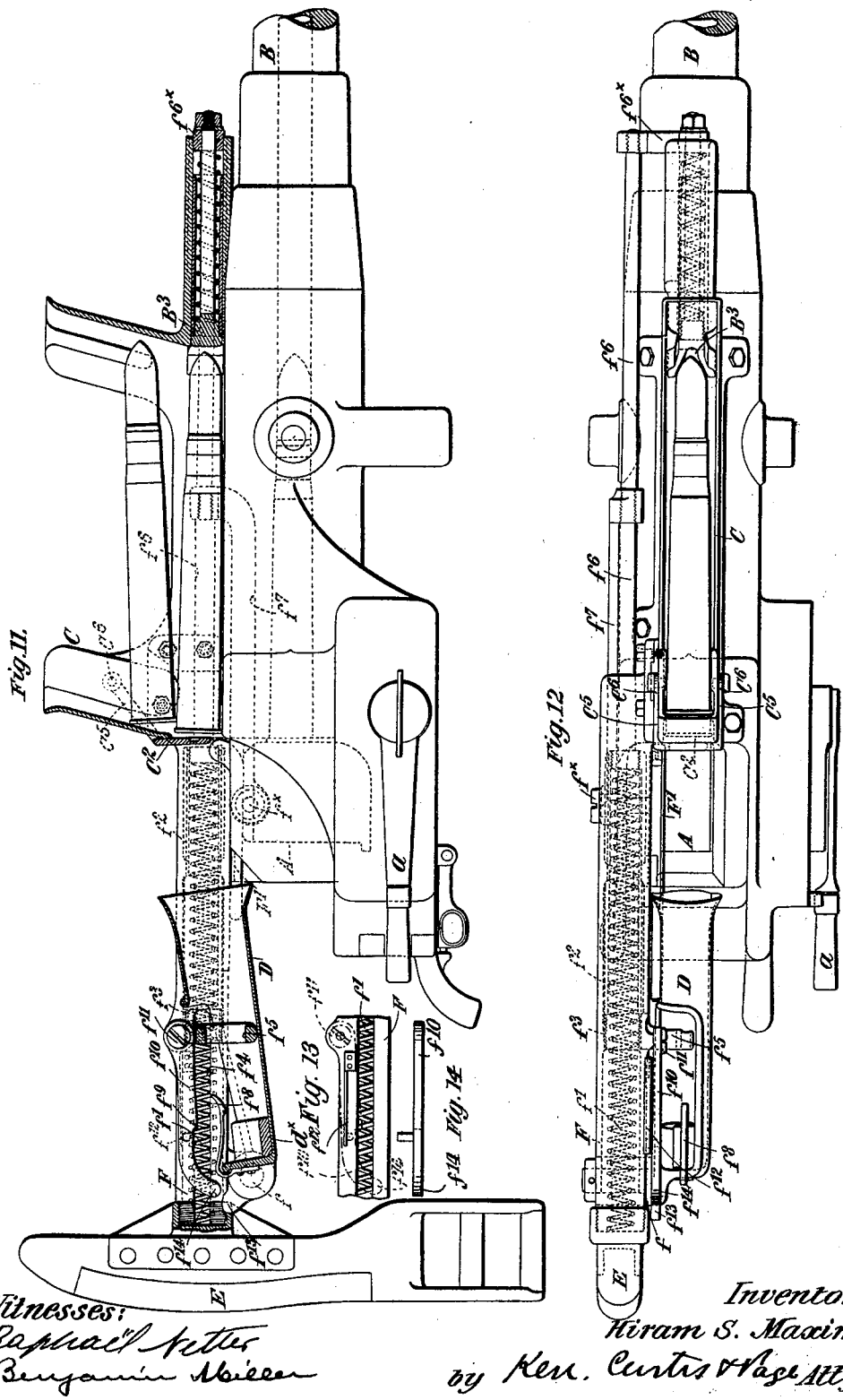
Witnesses:
Raphael Netter
Benjamin Miller
Inventor,
Hiram S. Maxim
by Kerr, Curtis & Page Attys.

(No Model.) 14 Sheets—Sheet 7.
H. S. MAXIM.
AUTOMATIC GUN.
No. 593,228. Patented Nov. 9, 1897.
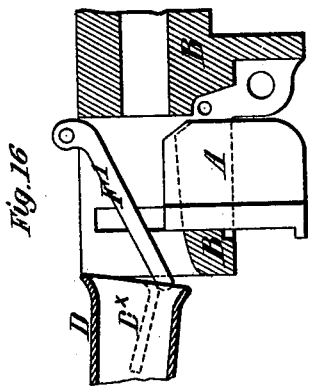
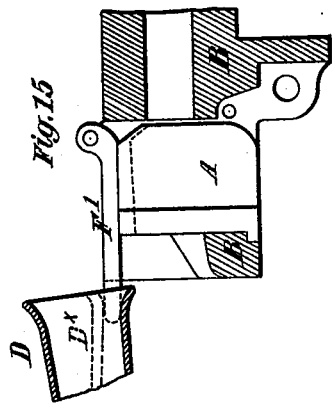
Witnesses:
Raphaël Netter
Benjamin Meiller.
Hiram S. Maxim, Inventor
by Kerr, Curtis & Page, Attys

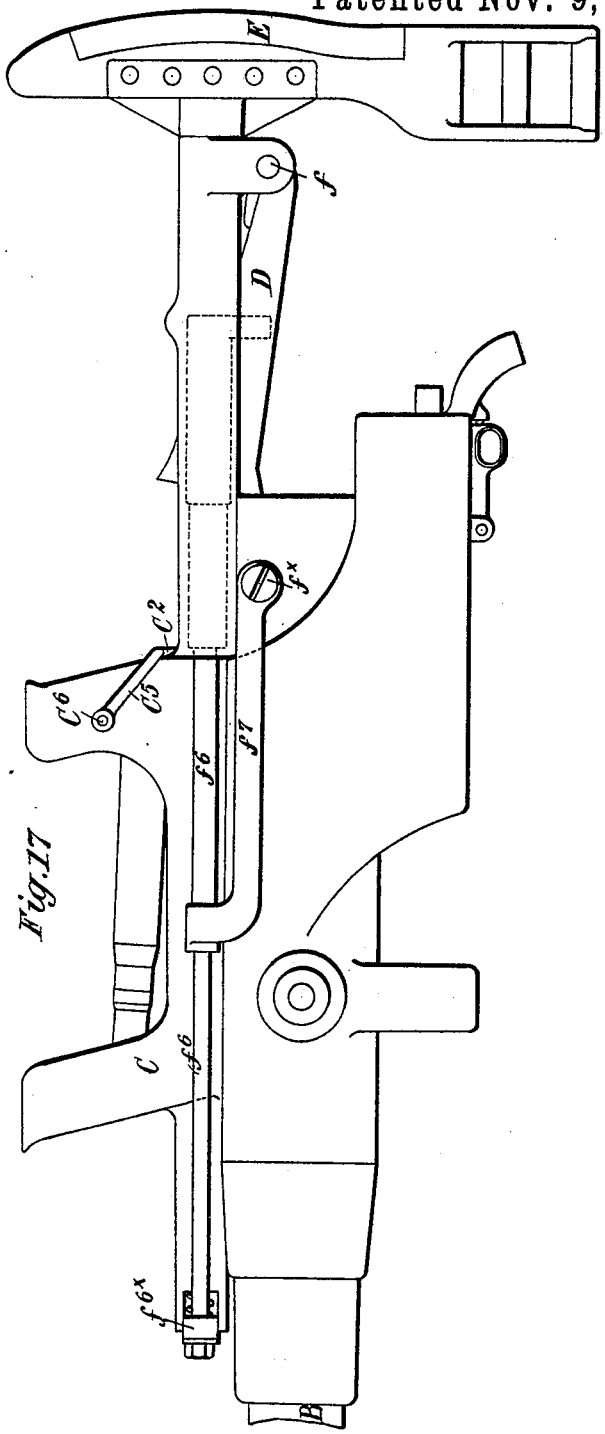

(No Model.) 14 Sheets—Sheet 9.
H. S. MAXIM.
AUTOMATIC GUN.
No. 593,228. Patented Nov. 9, 1897.
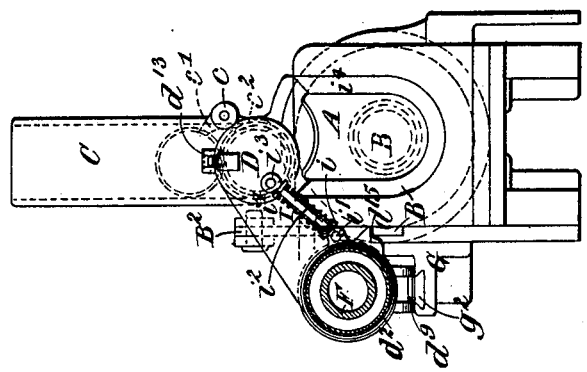
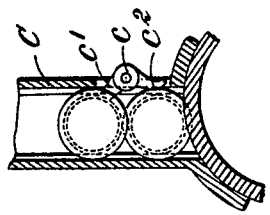
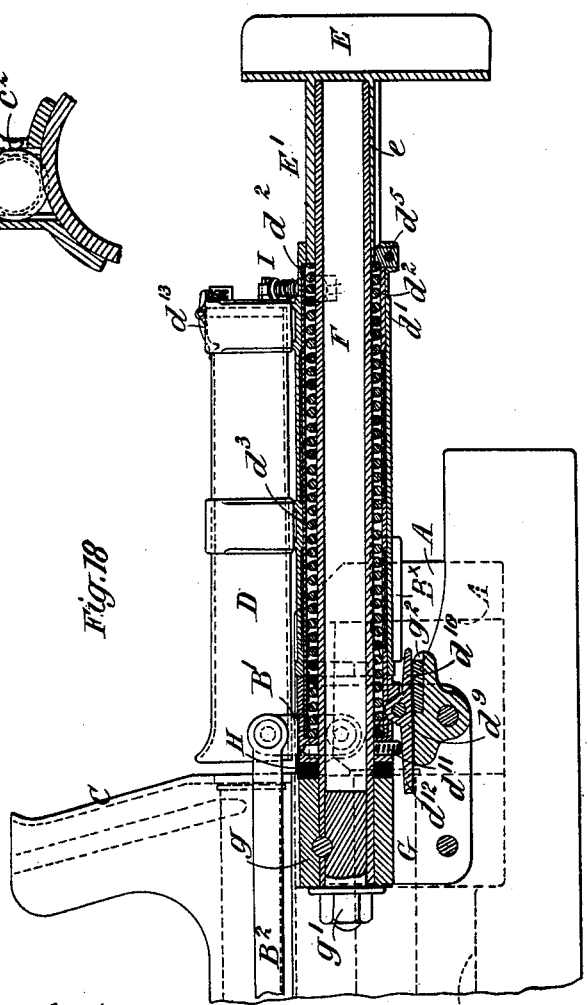
Witnesses:
Raphael Netter
Benjamin Miller
Inventor
Hiram S. Maxim,
by Ken. Curtis & Page. Att'ys
THE NORRIS PETERS CO., PHOTO-LITHO., WASHINGTON, D. C.

(No Model.) 14 Sheets—Sheet 10.
H. S. MAXIM.
AUTOMATIC GUN.
No. 593,228. Patented Nov. 9, 1897.
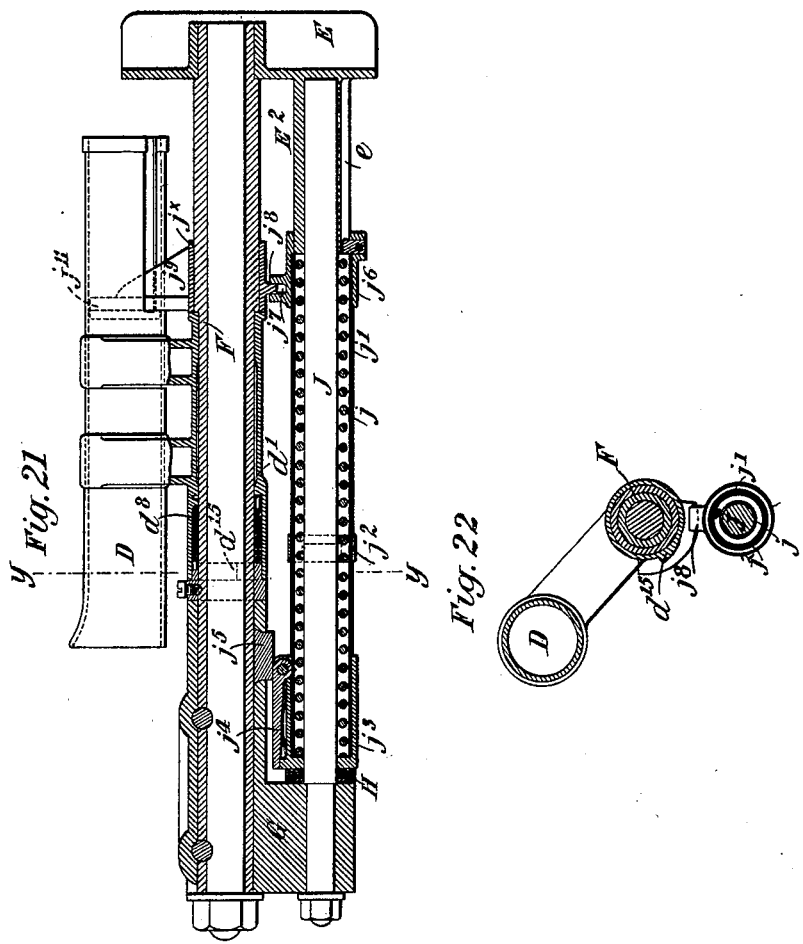
Witnesses:
Hiram S. Maxim, Inventor (No Model.)  14 Sheets—Sheet 11.
H. S. MAXIM.
AUTOMATIC GUN.
No. 593,228.  Patented Nov. 9, 1897.
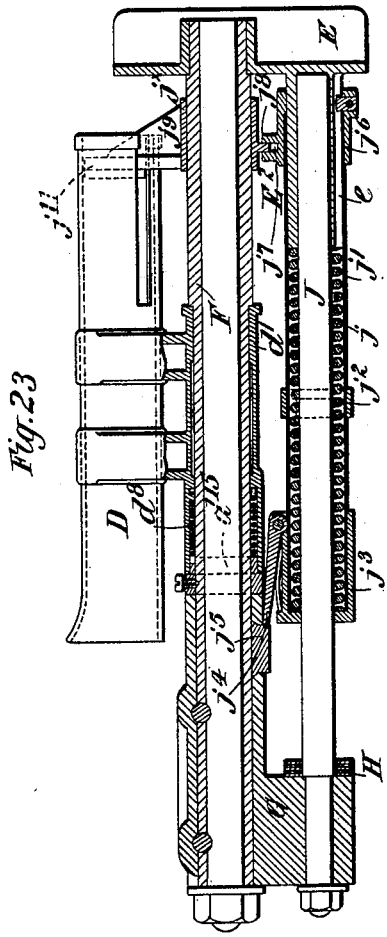
Witnesses:
Raphaël Netter
Benjamin Meiller
Hiram S. Maxim, Inventor
by Ken, Curtis & Page Attys (No Model.)  14 Sheets—Sheet 12.
H. S. MAXIM.
AUTOMATIC GUN.
No. 593,228. Patented Nov. 9, 1897.
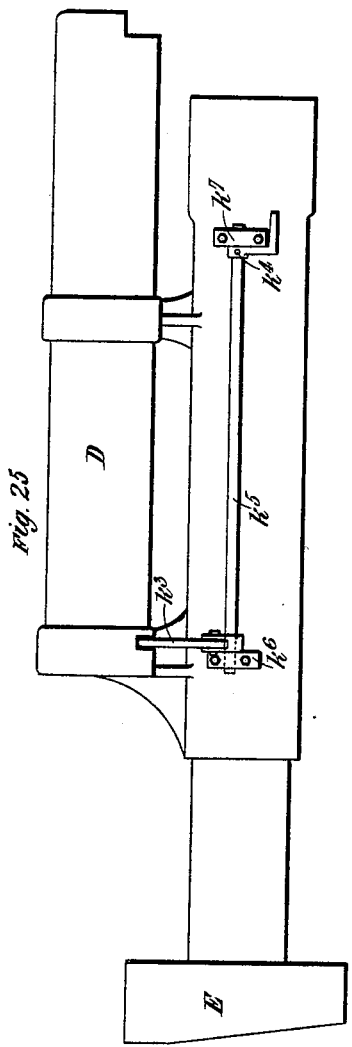
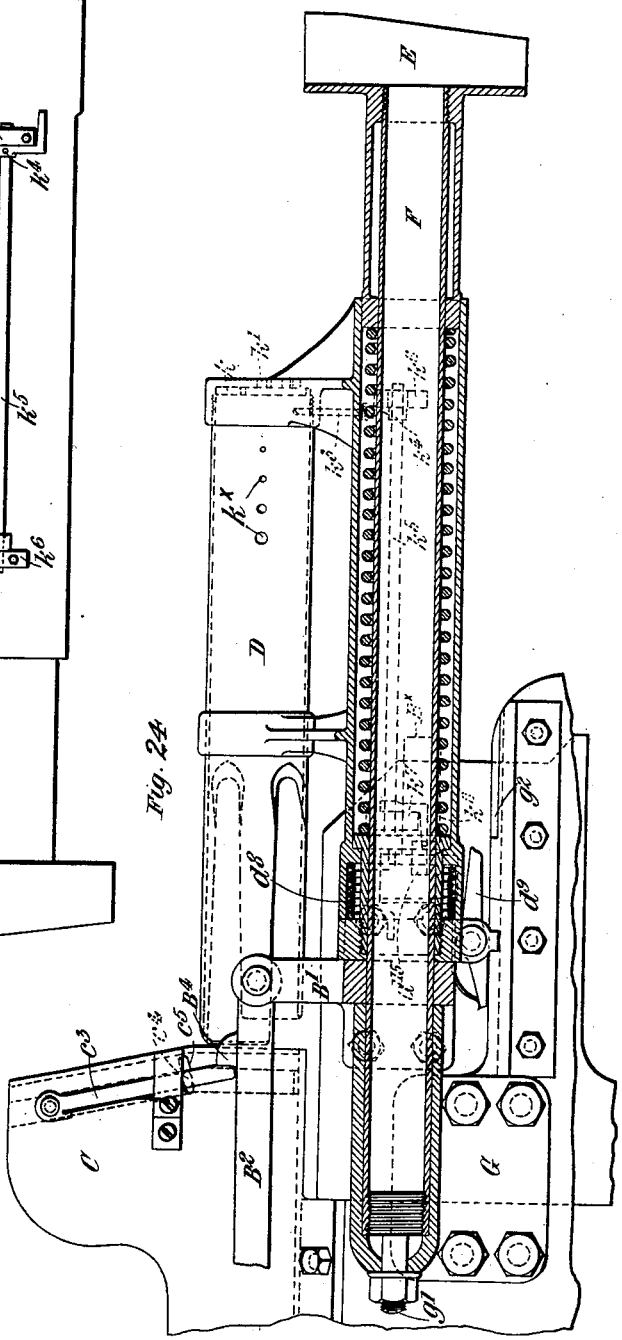
Witnesses:
Raphael Netter
Benjamin Meiller
Hiram S. Maxim, Inventor
by Kerr, Curtis & Page. Atty's (No Model.) 14 Sheets—Sheet 13.

H. S. MAXIM.
AUTOMATIC GUN.

No. 593,228. Patented Nov. 9, 1897.

Witnesses: Hiram S. Maxim, Inventor (No Model.)  14 Sheets—Sheet 14.
H. S. MAXIM.
AUTOMATIC GUN.
No. 593,228. Patented Nov. 9, 1897.
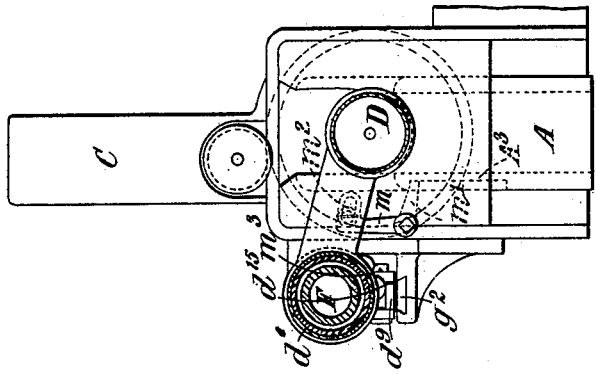
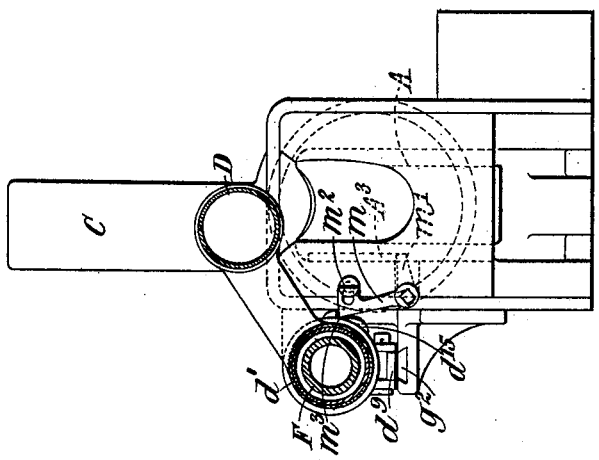
Witnesses:
Raphael Netter
Benjamin Miller
Hiram S. Maxim, Inventor
by Ken. Curtis & Page, Att'ys

United States Patent Office.

HIRAM STEVENS MAXIM, OF LONDON, ENGLAND, ASSIGNOR TO THE MAXIM-NORDENFELT GUNS AND AMMUNITION COMPANY, LIMITED, OF SAME PLACE.

AUTOMATIC GUN.

SPECIFICATION forming part of Letters Patent No. 593,228, dated November 9, 1897.

Application filed November 14, 1896. Serial No. 612,132. (No model.) Patented in England December 10, 1895, No. 23,689; in France October 15, 1896, No. 260,468; in Belgium October 16, 1896, No. 124,028; in Italy October 23, 1896, No. 32/42,859; in Spain November 21, 1896, No. 19,825, and in Austria January 14, 1897, No. 14/135.

*To all whom it may concern:*

Be it known that I, HIRAM STEVENS MAXIM, mechanical engineer, a citizen of the United States, residing at 18 Queens Gate Place, London, in the county of Middlesex, England, have invented certain new and useful Improvements in and Relating to Automatic Guns, of which the following is a specification, reference being had to the accompanying drawings.

I have obtained patents for this invention in the following countries: Great Britain, No. 23,689, dated December 10, 1895; France, No. 260,468, dated October 15, 1896; Belgium, No. 124,028, dated October 16, 1896; Austria, No. 14/135, dated January 14, 1897; Italy, No. 32/42,859, dated October 23, 1896, and Spain, No. 19,825, dated November 21, 1896.

The invention which forms the subject of the present application is an improvement in automatic guns devised with special reference to those having a caliber of one and a half to four inches, but applicable to even larger guns, and having as its object the provision of means whereby all of the operations required in the working of the gun, except pulling of the trigger, may be effected automatically and with certainty and precision.

The invention is shown as applied to guns in which the breech-block slides downward to open the breech, and the improvements are preferably used in connection with guns of this special type.

In quick-firing guns it frequently happens that the cartridge is not pushed into the barrel with sufficient force to send it fully home, whereupon the breech mechanism cannot be operated effectually and firing is delayed. Delay in firing is also sometimes caused by reason of the gunner's attempting to close the breech before the cartridge is fully inserted. According to my invention such delays are avoided and the cartridge is inserted into the barrel automatically with ample force to insure its being thrust fully home.

For the purpose of my invention I provide the gun with a cartridge-carrier into which the cartridges are received one by one from the magazine or otherwise, the said carrier being so arranged that the energy of the recoil of the gun will cause it to automatically bring the cartridge it contains into alinement with the barrel and deliver it into the cartridge-chamber, after which the said carrier will assume its normal position ready to receive a fresh cartridge; and it is a peculiarity of my present invention that the successive cartridges are automatically thrown or projected instead of being pushed from the magazine into the carrier and from the carrier into the barrel. This is a very important feature of my invention, because it permits the use of cartridges whose length is greatly in excess of the length of the recoil movement of the gun.

In order that my said invention may be clearly understood and readily carried into effect, I will proceed to describe the same more fully with reference to the accompanying drawings, in which—

Figure 10:
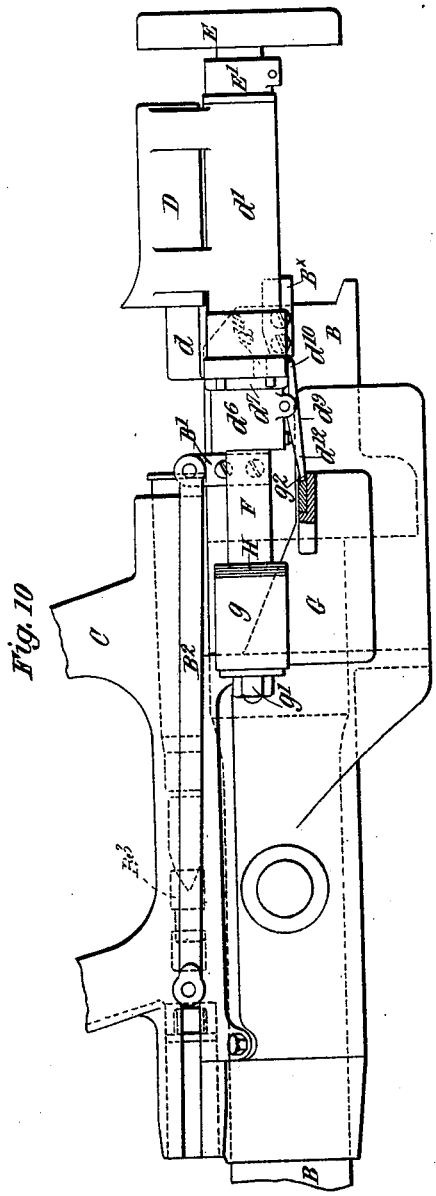
Figure 26:
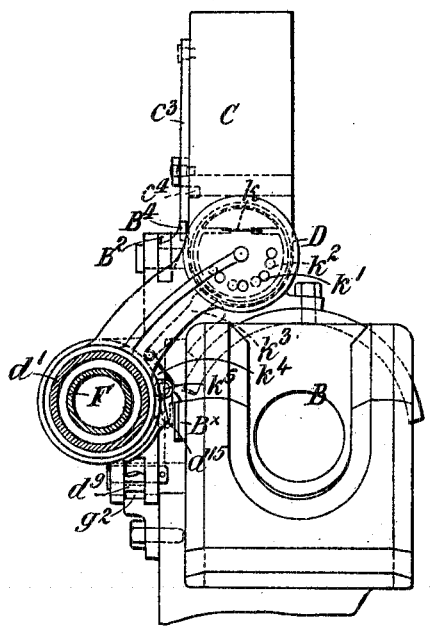
Figure 27:
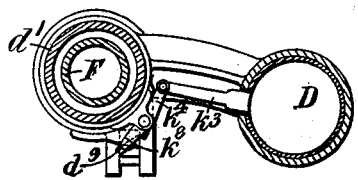
Figure 28:
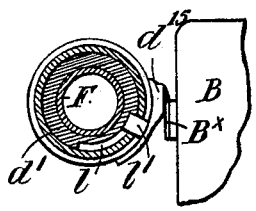

Figure 1 is a sectional elevation of such portions of a gun of the kind described as are necessary for an understanding of the invention. Fig. 2 is a top plan view of the same. Fig. 3 is a vertical transverse section on the line *x x* of Fig. 1, showing the cartridge-carrier arranged to slide on and oscillate about a rod or bar forming part of the shoulder-piece of the gun. Fig. 4 is a similar view showing the parts in another position. Fig. 5 is a side elevation, on a reduced scale, of the gun mechanism shown in Fig. 1. Fig. 6 is a plan view, on an enlarged scale, of the forward portion of the magazine and the device for ejecting the cartridges therefrom. Fig. 7 is a central longitudinal section of the mechanism of Fig. 6 detached from the barrel. Fig. 8 is a similar view of the same in another position. Fig. 9 is a cross-section on the line *z z* of Fig. 8, and Fig. 10 is a view similar to Fig. 5, but showing the cartridge-carrier in its rearmost position. Fig. 11 is a sectional elevation of a modified form of gun mechanism embodying my invention; Fig. 12, a top plan view of the same. Figs. 13 and 14 are views of details of mechanism detached from the working portions of the gun. Figs. 15 and 16 are sectional elevations, on an enlarged scale, of details of construction forming a part of the gun of Fig. 11. Fig. 17 is a view in elevation of the opposite side of the gun shown in Fig. 11. Fig. 18 is a sectional view of another modified form of cartridge-carrier and the mechanism immediately connected therewith. Fig. 19 is a section of a portion of the magazine of Fig. 18. Fig. 20 is a rear view of the gun of Fig. 18. Fig. 21 is a sectional view of a further modification of the invention. Fig. 22 is a section of the same on line $y\,y$. Fig. 23 is a sectional view showing the mechanism of Fig. 21 in another position. Fig. 24 is a sectional elevation illustrating further modifications of the improvement. Fig. 25 is a view in elevation of the opposite side of the mechanism shown in Fig. 24. Fig. 26 is an end view, partly in section, of the mechanism of Fig. 24. Figs. 27 and 28 are sectional details of the said mechanism; and Figs. 29 and 30 are end views, partly in section, of a gun, showing further modifications in the construction of the cartridge-carrier and with the parts in different positions.

In all the figures, A is the breech-block; B, the recoiling barrel; D, the cartridge-carrier, and E the shoulder-piece or crutch. As before stated, the breech-block here shown is adapted to slide in a vertical plane to open and close the breech.

In Fig. 2 is shown a lever-handle $a$, by means of which the gunner can operate the breech-block by hand.

Referring now to Figs. 1, 2, and 3, the cartridge-carrier D therein shown consists of a hollow cylindrical receptacle closed at its rear end and having a bell-mouthed opening and a lip $d$ at its forward end. The said carrier is formed in one piece with a sleeve $d'$, which is adapted to loosely fit and turn on a cylinder $d^2$, forming part of a tubular casing, which is capable of rectilinear movement on a hollow rod F against the resistance of a spiral spring $d^3$, contained within the said cylinder. This spring surrounds the rod F and abuts at one end against an internal shoulder $d^4$ at the forward extremity of the said tubular casing and at the other end against the socket E', by which the shoulder-piece E is secured to the rod F. This socket E' has a longitudinal slot $e$ in its under side to receive a corresponding projection $d^5$ on a thickened end of the tubular casing secured to the cylinder $d^2$, so that, although the casing will be free to slide longitudinally, it will be prevented from turning. The aforesaid sleeve $d'$ has an enlarged end at $d^6$, which abuts against a shoulder $d^7$, formed on the forward end of the tubular casing, which is secured to the cylinder $d^2$, and the said end $d^6$ serves as a box for the reception of a spiral spring $d^8$. One end of this spring is connected to the said shoulder $d^7$ and the other end to the sleeve $d'$ in such manner that the spring exerts a force tending to rotate the carrier D around the cylinder $d^2$ and to maintain said carrier when empty in the raised position in which it is shown in Figs. 1 and 3.

The forward end of the tubular casing carries a pivoted pawl or catch $d^9$, having a tail $d^{10}$. This pawl is acted upon by a spring $d^{11}$, set in the forward end of the casing, and which tends to force the nose $d^{12}$ of the said pawl in a downward direction.

G is a bracket bolted to the framing or some stationary part of the gun and carrying the rod F, which is firmly connected to a socket $g$ on the said bracket by the nut $g'$.

H is a buffer consisting of leather washers or other suitable material interposed between the front end of the tubular casing and the socket $g$ of the bracket for the purpose of diminishing or deadening the concussion between these parts when the spring $d^3$ reacts after its compression by the recoil of the gun.

In the bracket G is a notch $g^2$, which receives the nose of the pawl $d^9$ when the tubular casing and carrier slide backward, such engagement of the pawl with the notch keeping the carrier in its retracted position until the pawl is released.

Firmly secured to the barrel B, near its breech end, is a lug B', which is connected by a rod $B^2$ to a cup-shaped spring buffer or plunger $B^3$, which when the barrel recoils acts upon the nose of the lowermost cartridge in the magazine C, so that the said cartridge is forcibly expelled rearwardly from the magazine through an exit-opening C' and thrown or projected into the carrier D—that is to say, the aforesaid plunger $B^3$ has only a comparatively short rearward movement, and therefore it does not expel the cartridge from the magazine by a continuous push, but by a sudden blow, so that, as above stated, the comparatively short movement of recoil is sufficient to cause the delivery from the magazine to the carrier of a cartridge having a length much greater than that of the recoil movement of the barrel. The closed end of the said carrier is provided with a leather or other buffer D' for absorbing the force of the shock when the base of the cartridge strikes the end of the carrier. The exit-opening C' of the magazine is provided with a hinged flap $C^2$, which is kept in its closed position by means of a spring $C^3$, acting upon a tappet $C^4$, carried by the hinge-pin of the flap. This flap serves as a guard to protect the detonator of the lowermost cartridge in the magazine from being accidentally struck by the nose of the cartridge in the carrier.

In order to prevent the cartridge from rebounding when it is thrown from the magazine into the carrier, I provide the latter with a spring-controlled catch $d^{13}$, which engages with the rim of the cartridge and offers sufficient resistance to prevent its rebounding or its accidental escape when the gun is fired at depression.

As before stated, the carrier D when empty normally occupies the position represented in Figs. 1 and 3 under the influence of its spring $d^3$—that is to say, it lies in alinement with the exit-opening from the magazine ready to receive the lowermost cartridge therefrom.

When the gun is discharged and the barrel B recoils, the lug B' actuates the spring-plunger B³ in the magazine by exerting a pull on the rod B², and at the same time it forces backward the tubular casing, composed of the cylinder $d'$ and the enlarged ends secured thereto by exerting a backward pressure on a projection $d^{14}$ on the forward end of the said casing, as shown more clearly in Fig. 2. Therefore the lowermost cartridge is thrown from the magazine into the carrier simultaneously with the rearward movement of the latter. As the tubular casing and carrier complete their rearward movement the nose of the pawl $d^9$ comes into engagement with the notch $g^2$, whereby the carrier and the cartridge it contains are retained in their rearward position. The barrel in regaining its firing position causes a cam-like projection B<sup>×</sup> on the framing of the breech end to come beneath a cam-piece $d^{15}$ on the cylinder-sleeve $d'$ of the carrier, as shown in Figs. 3 and 4, so that the carrier is supported in its elevated position until the barrel has almost regained its firing position.

During the forward movement of the barrel the breech-block has descended to open the breech, and when the barrel is in its forward position the cam-piece $d^{15}$ will be clear of the projection B<sup>×</sup>, so that the carrier is then permitted to turn downwardly by the weight of the cartridge which it contains into a position to bring such cartridge into alinement with the barrel, as shown in Fig. 4. As the carrier assumes this position the said cam-piece $d^{15}$ is brought by the partial rotation of the sleeve $d'$ into the position shown in Fig. 4, where it strikes and depresses the tail of the pawl $d^9$, thereby disengaging the nose of said pawl from the notch $g^2$. The compressed spring $d^3$ is thus released, and by its reaction causes the carrier to forcibly move forward toward the cartridge-chamber. The sudden stoppage of the said carrier as the forward end of the tubular casing $d^2$ strikes the buffer H allows the cartridge, by its momentum, to escape from the temporary restraint of the catch $d^{13}$ and to be forcibly thrown or projected completely home into the cartridge-chamber. The carrier no longer kept in its position of alinement with the bore of the barrel by the weight of the cartridge resumes its elevated position under the influence of the spring $d^8$ and is then ready to receive a fresh cartridge from the magazine. As the cartridge enters the cartridge-chamber it acts upon well-known mechanism whereby the breech-block is released and allowed to ascend to close the breech. Meanwhile the cam-piece $d^{15}$ has regained the original position represented in Fig. 1, and the parts are therefore once more in condition to perform a similar cycle of operations at the next discharge of the gun. By keeping the trigger pulled the gun will continue to fire automatically so long as cartridges are supplied to the carrier.

In the arrangement illustrated in Figs. 11 and 12 the carrier does not shift longitudinally on the rod F or rotate thereon, as described, with regard to Figs. 1 to 3; but the said carrier is pivotally connected at its closed end to a fixed bracket $f$, forming part of the hollow rod F. The hollow rod contains a spiral spring $f'$ and a sliding tube $f^2$. This tube $f^2$ is closed at its forward end, and at its rear end is screw-threaded to receive a lug $f^3$, which projects through a longitudinal slot $f^4$ in the hollow rod F. The lug $f^3$ is provided with an annular extension forming a piston $f^5$, that is capable of sliding to and fro in the carrier D, the forward movement of the said piston being limited by the slot $f^4$ and the rearward movement by the buffer $d^\times$ within the carrier. The aforesaid spring $f'$ bears at one end against the closed extremity of the tube $f^2$ and at its other end against the shoulder-piece E. The carrier is represented in Fig. 11 in its raised position ready to receive a cartridge from the magazine C—that is to say, its bell-mouth lies opposite the lowermost cartridge in the magazine, the carrier being held in this position by a pivoted finger F', whose position is regulated by the breech-block. The closed end of the aforesaid tube $f^2$ is connected to a rod $f^6$, which is affixed at $f^\times$ to the barrel by an arm $f^7$, so as to recoil therewith. As in the construction previously described the magazine is provided with a spring-plunger B³ for expelling successive cartridges from the magazine as the barrel recoils, and to this plunger the aforesaid rod $f^6$ is connected by an arm $f^{6\times}$.

When the recoil of the barrel takes place, the lowermost cartridge in the magazine is thrown into the carrier D by the action of the said plunger B³, as already stated, and at the same time the spring $f'$ is compressed by the longitudinal movement of the rod $f^6$, whereby the annular piston $f^5$ recedes as the cartridge enters the said carrier. As the cartridge and the annular piston thus recede the nose of a spring-catch $f^8$, carried by the closed end of the carrier, is caused to project through the said annular piston and engage with the rim of the cartridge, thereby restraining the said cartridge from any tendency on its part to rebound from the carrier. At the same time the annular piston comes into engagement with a shoulder $f^9$ on an arm $f^{10}$, which is pivoted at $f^{11}$ to the hollow rod F and is normally kept in its engaging position by a spring $f^{12}$. The annular piston is therefore temporarily prevented from returning under the influence of the compressed spring $f'$ and the cartridge remains in the carrier ready to be thrown into the barrel at the required time.

When the breech-block descends to open the breech, the pivoted finger F' likewise descends and allows the carrier to descend by its own weight and that of the cartridge it contains, so as to bring its mouth opposite to the cartridge-chamber in the barrel. Simultaneously with this movement of the carrier a cam piece or tooth $f^{13}$ on the pivotal end of the said carrier bears against and actuates the curved end $f^{14}$ of the arm $f^{10}$, whereby the latter is raised and its shoulder $f^9$ brought out of engagement with the annular piston $f^5$. Therefore the piston $f^5$ being no longer restrained suddenly advances under the action of the compressed spring $f'$ and completes its limited forward movement, thereby expelling or throwing the cartridge from the carrier into the cartridge-chamber.

When the breech-block ascends again to close the breech, the arm F' is likewise elevated, and thereby raises the carrier into the position represented in Fig. 11, ready to receive a fresh cartridge at the next recoil of the gun.

As in the previously-described arrangement the exit-opening of the magazine is provided with a flap $C^2$, which is connected by arms $C^5$ to pivots $C^6$; but in this case the said flap closes by the action of gravity instead of by a spring.

In the arrangement illustrated in Figs. 18 to 20 I have shown means whereby the spring $d^3$, referred to in connection with Figs. 1, 2, and 3, can be dispensed with, the said carrier being brought into its raised position by the breech-block. In this case I employ a spring device I, which consists of a socket $i$, pivotally connected to a lug $i'$ on the tubular casing $d^2$, and of a pin $i^2$, adapted to slide in the aforesaid socket and pivotally connected to a lug $i^3$ on the carrier. The socket and its sliding pin occupy a diagonal position and are surrounded by a spiral spring $i^4$.

It will be remembered that the casing $d^2$ does not oscillate, and consequently the lug $i'$ does not alter its angular position when the carrier turns about the rod F. Therefore when the carrier is in either of its extreme upward or downward positions the spring $i^4$ acts to retain the said carrier in such position. The carrier D is in the present example shown of increased length, so that its mouth lies quite close to the exit-opening in the magazine. In other respects the arrangement is similar to that shown by Figs. 1 to 3 and operates in an analogous manner.

The carrier D is raised by the breech-block in the following manner: When the cartridge is expelled from the magazine into the carrier D, the weight of such cartridge tends to turn the carrier angularly about the tubular casing $d^2$, and as soon as the breech-block A descends said carrier will likewise descend and turn angularly about the tubular sleeve. Then when the breech-block rises again it will act directly on the carrier and force it to assume its elevated position.

The breech-block in the form of gun shown in Figs. 29 and 30, hereinafter referred to, is operated in an analogous manner to that above described.

For the purpose of preventing the combined weight of the superimposed cartridges in the magazine from retarding the expulsion of the lowermost cartridge I have shown in Figs. 19 and 20 the magazine provided with an escapement which comprises a pivoted double-armed pawl $c$, one of the said arms—viz., $c'$—serving to support the cartridge that is immediately above the lowermost one, and the other arm—viz., $c^2$—resting against the side of the said lowermost cartridge. As the lowermost cartridge is expelled from the magazine the arm $c^2$ turns inwardly, owing to the weight of the upper cartridges turning the arm $c'$ outwardly. This movement releases the next succeeding cartridge and allows it to fall, and in so doing it acts upon and turns outwardly the arm $c^2$, thereby again bringing the arm $c'$ into its original position to support the upper cartridges.

In Figs. 21 to 23 I have illustrated a construction whereby the carrier D does not slide longitudinally, but only receives an oscillatory or rocking movement. For this purpose I provide a rod J immediately below the crutch-rod F. This rod, like the rod F, is stationary and is surrounded by a spiral spring $j$, which is contained within a sliding casing $j'$. The socket $E^2$, which receives the outer end of the rod J, is formed with a longitudinal slot $e$ to receive a projection on the casing $j'$, so that the latter can slide on the rod J without turning thereon. The inner ends of both rods F and J are rigidly connected to a bracket G, carried by some stationary part of the gun.

$j^2$ is a fixed collar on the casing $j'$, and this collar is acted upon by some recoiling part of the gun. The inner end of the said casing $j'$ is closed by a cap $j^3$, between which and the bracket G is interposed a buffer, as in the arrangement described in connection with Figs. 1, 2, and 3. This cap carries a spring-controlled pawl $j^4$, which is adapted to engage with a fixed projection $j^5$ when the casing $j'$ recoils and compresses the spring $j$. The outer end of the said casing $j'$ is provided with a collar $j^6$, formed with a segmental groove $j^7$, which receives a segmental flange $j^8$, projecting from a short sleeve $j^\times$, loosely mounted on the rod F. An arm $j^9$ also extends laterally from this short sleeve and protrudes through a longitudinal slot in the carrier D, and is furnished with a piston $j^{11}$, which works within the carrier. On recoil of the barrel the rearward movement of the casing $j'$ brings the pawl $j^4$ into engagement with the projection $j^5$, and thereby retains the casing $j'$ in its rearward position and keeps the spring $j$ compressed. At the same time a rearward movement is imparted to the piston $j^{11}$ as the cartridge enters the carrier D from the magazine, and when the breech is opened the carrier turns into its lowered position under the weight of the cartridge it contains. As the carrier turns the cam-piece $d^{15}$ acts on the pawl $j^4$, and by depressing it disengages its nose from the projection $j^5$ and allows the compressed spring $j$ to react and thrust forward the piston $j^{11}$, whereby the cartridge in the carrier is thrown therefrom into the barrel in a similar manner to that already stated in connection with Figs. 11 and 12. The spring $d^8$ then acts to raise the empty carrier into its elevated position ready to receive a fresh cartridge.

In Figs. 24 to 26 I have shown a carrier which, in so far as its angular rectilinear reciprocating movements are concerned, is similar to the carrier illustrated in Figs. 1, 2, and 3; but in the present example I have constructed it with a flap-valve $k$ and a series of openings $k'$ at its closed end. The internal diameter of the said carrier is such that the rim of the cartridge will approximately fit it and work therein like a piston, so that as the cartridge is forcibly thrown from the magazine into the carrier when the barrel recoils the said cartridge will more or less compress the air within the carrier, and thereby create sufficient resistance to its movement to bring it quietly to rest. In order to regulate the escape of the air from the carrier, so that the resistance to the movement of the cartridge therein can be varied, I provide the aforesaid flap-valve with holes $k^2$, which by shifting the said valve angularly can be caused to more or less correspond with the holes $k'$. I find it advantageous to form in the wall of the said carrier a series of perforations $k^\times$ for enabling the air compressed by the cartridge to escape, the said perforations being preferably so arranged that they gradually decrease in size, so that the escape of air is reduced as the cartridge approaches the end of the carrier and the resistance to its movement thereby correspondingly increased.

In order to prevent the cartridge from leaving the carrier by the reaction of the compressed air after the energy of the moving cartridge has been exhausted, I provide a finger $k^3$, which protrudes into the carrier at a point where it will be capable of engaging with the rim of the cartridge when the latter is fully home in the carrier. This finger is coupled by a crank $k^4$ to a spindle $k^5$, which is carried in bearings $k^6$ $k^7$ on the sleeve $d'$ of the carrier. The said spindle $k^5$ is provided with an arm $k^8$, which is so arranged that when the carrier assumes its lowered position and brings the aforesaid cam-piece $d^{15}$ into contact with the tail of the pawl $d^9$ to disengage the latter from the notch $g^2$ the said arm $k^8$ will also come against the said pawl (see Fig. 27) and by so doing will partially rotate the spindle $k^5$, and thereby remove the finger $k^3$ from engagement with the rim of the cartridge. At the same time as this release takes place the carrier is propelled forward by the compressed spring $d^3$, and the cartridge, being unrestrained by the said finger $k^3$, is forcibly thrown from the carrier into the barrel, as already explained with reference to Figs. 1 to 3. The aforesaid finger $k^3$ also serves to prevent the cartridge from falling out of the carrier when the gun is fired at depression.

As in the construction illustrated by Figs. 18 to 20, I provide the magazine with an escapement for controlling the descent of the cartridges; but in this case I employ a pivoted spring-controlled pawl $c^3$, having a tooth $c^4$, which projects through a curved slot $c^5$ in the magazine and lies adjacent to the cartridge immediately above the lowermost one. A projection $B^4$ is formed on the rod $B^2$, and this projection normally keeps the pawl in its disengaged position. When, however, the barrel recoils on firing the gun, the rearward movement of the rod $B^2$ causes the said projection $B^4$ to leave the pawl and allow the latter to be shifted by its spring into a position to engage with the cartridge immediately above the lowermost one. As the barrel regains its firing position and the rod $B^2$ moves forward again the said projection $B^4$ returns the pawl to its disengaged position, so that it will no longer support the cartridges in the magazine, thereby permitting them to descend and a fresh cartridge to take the place of the lowermost one that has just been expelled from the magazine.

In order to regulate the extent of angular movement of the carrier, a segmental slot $l$, Fig. 28, may be formed in some non-rotary part contiguous to the sleeve $d'$, and the cam-piece $d^{15}$, carried by the oscillatory sleeve, has a stop $l'$, which projects into the aforesaid slot and by coming against the opposite ends thereof limits the angular movement of the carrier.

Figs. 29 and 30 illustrate modified means for locking the carrier in its raised position, and consist of a catch pivoted to the recoiling barrel of the gun and having two arms $m$ $m'$, the former being slotted to receive a stationary guide-pin $m^2$ and the latter entering a vertical groove $A^3$, formed in the breech-block. The pin $m^2$ serves to give stability to the end of the arm $m$, so that there is no liability of its becoming bent or otherwise deformed by the rapid and sudden movements it receives and limits the extent of movement of the said arm. The extremity of the arm $m$ is adapted to engage with a notch $m^3$ in the cam-piece $d^{15}$ of the carrier-sleeve when the breech-block is in its elevated position, and thus supports the carrier. When the breech-block completes its descent, the upper end of the said vertical slot $A^3$ acts upon the arm $m'$, and thereby turns the other arm $m$ inwardly, so as to release the carrier and allow it to fall into the position represented in Fig. 30 by the weight of the cartridge it contains. It will be seen that by this arrangement the carrier cannot descend until the breech-block is in its lowermost position and the breech fully opened.

Although I have shown and described several examples of the manner in which my cartridge-carrier can be applied to a gun, I wish it to be understood that I do not confine myself exclusively thereto.

In some instances the magazine may be dispensed with and the cartridges be placed in the aforesaid carrier by hand.

What I claim is—

1. In a recoil-operated gun the combination with a non-recoiling part thereof, of a cartridge-carrier, a spring that is energized by the recoil movement of the barrel, a catch for temporarily retaining the said spring in its energized condition, and means for releasing the catch to permit the said spring to react and throw the cartridge from the carrier into the cartridge-chamber of the gun.

2. In a recoil-operated gun the combination with a non-recoiling part thereof, of a cartridge-carrier, a carrier-spring that is energized by the recoil movement of the barrel, a magazine having a plunger which is actuated by the recoil movement of the barrel and adapted to perform a short sudden movement to throw a cartridge from the magazine into the carrier, a catch for temporarily retaining the carrier-spring in its energized condition, and means for releasing the catch to permit the said spring to react and throw the cartridge from the carrier into the cartridge-chamber of the gun.

3. In a recoil-operated gun the combination with the crutch-rod, of an oscillatory cartridge-carrier which when empty occupies a position to receive a cartridge as the latter is projected from the magazine, a recoil-spring surrounding the said crutch-rod and inclosed in a suitable casing, a catch carried by the said casing and adapted to retain the recoil-spring in its compressed condition, and a projection moving with the carrier which as the latter performs its oscillatory movement to bring the cartridge opposite the cartridge-chamber, releases the said catch and thereby permits the carrier-spring to react and throw the cartridge into the cartridge-chamber substantially as described.

4. In a recoil-operated gun, the combination with the crutch-rod and the spring mounted thereon, of a rectilinear reciprocating cylindrical casing inclosing the said spring, an oscillatory cartridge-carrier having a sleeve by which it is loosely connected to the said casing so as to oscillate thereon, a catch on the said cylindrical casing for engaging with a notch on a stationary part of the gun when the carrier retires to compress the spring under the action of the recoiling barrel, a lateral projection on the carrier-sleeve for releasing said catch as the carrier turns downwardly with the cartridge it contains, a cam-like projection on the barrel for supporting said lateral projection and preventing the carrier from turning downwardly until the barrel regains its firing position, a stop against which the aforesaid cylindrical casing strikes and is thereby suddenly stopped as it advances with the carrier under the reaction of the spring, whereby the cartridge in the carrier is forcibly thrown therefrom into the cartridge-chamber, and means whereby the empty carrier is caused to ascend and regain its normal position ready to receive a fresh cartridge substantially as described.

5. In a recoil-operated gun the combination with the cartridge-throwing carrier, of a magazine provided with means for throwing successive cartridges therefrom into the cartridge-throwing carrier, the said means consisting of a spring-plunger located at the front end of the magazine with its head directed inwardly to come against the nose of the lowermost cartridge in the magazine, an arm on said plunger, a lug on the recoiling barrel, a connecting-rod for coupling the aforesaid arm to the said lug, so that on recoil of the barrel the said plunger receives a short sudden movement to throw a cartridge rearwardly from the magazine into the carrier, the amplitude of such movement being less than the length of the cartridge thrown.

6. In a recoil-operated gun, the combination with the cartridge-throwing carrier and the cartridge-throwing magazine of a spring-plunger in the magazine, a lug on the recoiling barrel, a connecting-rod coupling the lug with the spring-plunger, and a projection on the sliding casing that incloses the carrier-spring, the said projection being situated immediately in rear of the aforesaid lug so that simultaneously with the throwing of the cartridge from the magazine into the carrier, the carrier-spring will be compressed substantially as described.

7. In a recoil-operated gun, the combination with the cartridge-throwing carrier and the cartridge-throwing magazine of means for preventing the accidental discharge of a cartridge in the magazine by the projectile of a cartridge in the carrier striking against its cap, the said means consisting of a pivoted flap at the exit-opening of the magazine, the said flap giving way to the cartridge as it is thrown from the magazine into the carrier, but normally acting as a cover to protect the rear end of the lowermost cartridge in the magazine substantially as described.

8. In a recoil-operated gun the combination with the oscillatory cartridge-throwing carrier and the carrier-spring carried by the crutch-rod, of a piston working within the carrier and connected with the said spring, a catch for engaging with the said piston when it occupies its rearward position, means for releasing said catch as the carrier arrives opposite the cartridge-chamber of the gun, and a stop against which the said piston strikes as it advances with the cartridge, whereby the said cartridge is forcibly thrown from the carrier into the cartridge-chamber substantially as described.

9. In a recoil-operated gun the combination with the oscillatory cartridge-throwing carrier and its spring-operated piston of a pivoted spring-controlled catch $f^{10}$ having a shoulder $f^9$ for the piston to engage with when in its retracted position and also having a curved piece $f^{14}$ which is adapted to be acted upon by a cam-piece $f^{13}$ on the carrier as the latter assumes its depressed position, whereby the said spring-piston is released and throws the cartridge from the carrier into the cartridge-chamber of the gun substantially as described.

10. In a recoil-operated gun the combination with a magazine and means for projecting the cartridges therefrom into the carrier, of a cartridge-carrier for receiving the cartridges, a spring for actuating the carrier to eject the cartridges into the breech-chamber and a retaining-catch situated near the rearward end of the carrier and adapted to engage with the rim of a cartridge as it completes its movement into the carrier, so as to retain the cartridge therein when the gun is depressed, as set forth.

11. In a recoil-operated gun provided with a cartridge-throwing carrier the combination with the cartridge-retaining catch, of means for operating it so as to release the cartridge when the cartridge-throwing carrier reaches its position opposite the cartridge-chamber, the said means consisting of a spindle $k^5$ on the carrier, a crank $k^4$ carried at one end of said spindle and engaging with the cartridge-retaining catch to operate it, and an arm $k^8$ also carried by said spindle, this arm being operated by striking against the pivoted catch $d^9$ as the carrier assumes its lowered position substantially as described.

12. In a recoil-operated gun the combination with the breech mechanism of a cartridge-carrier into which the cartridges are forcibly projected or thrown, the said carrier having a series of holes in its wall gradually diminishing in size toward the rear to permit a proper amount of air to be retained in the rear of the carrier and compressed therein by the cartridge as it enters, so as to act as a cushion to bring the cartridge gradually to rest, substantially as described.

13. In a recoil-operated gun the combination with the breech mechanism of a cartridge-carrier into which the cartridges are forcibly projected, of an adjustable air-valve at the rear of said carrier by means of which the escape of air confined by the cartridge as it enters may be regulated, substantially as described.

14. In a recoil-operated gun the combination with the cartridge-throwing carrier of telescopic rods diagonally located and connected respectively to the carrier and to the sleeve of said carrier, and a spiral spring surrounding the rods and normally tending to keep them extended when the carrier is in either of its extreme oscillatory positions so that the said carrier will tend to remain in one or other of such positions until shifted substantially as described.

15. In a recoil-operated gun the combination with the oscillatory cartridge-throwing carrier of means for preventing it from rocking until after the breech of the gun is fully opened or closed, the said means consisting of a pivoted two-armed lever one arm of which engages with a vertical groove in the breech-block and the other arm of which is capable of supporting the carrier in its raised position when the breech is closed, the said vertical groove being of such a length that the said lever is only operated thereby at the completion of an opening or a closing movement of the block substantially as described.

16. In a recoil-operated gun the combination with the oscillatory cartridge-throwing carrier mounted on the crutch-rod, of a piston likewise mounted on the crutch-rod and adapted to slide longitudinally thereon by the action of a carrier-spring located on a fixed rod below the crutch-rod, of a cylindrical casing inclosing this spring, and having a spring-catch for engagement with a fixed abutment when the carrier-spring is compressed by the recoil of the barrel, and of a coupling device for connecting the cylindrical casing with the piston so that the said casing can slide as well as oscillate, substantially as described.

17. In an automatic gun the combination with the cartridge-throwing magazine of a pivoted spring-controlled pawl $c^3$ provided with a tooth $c^4$ projecting through a slot $c^5$ in the magazine, and of a projection $B^4$ on the connecting-rod $B^2$, which projection normally keeps said pawl in its disengaged position, but enables it on recoil of the barrel to occupy its engaged position substantially as described and for the purpose specified.

In testimony whereof I have hereunto set my hand this 5th day of October, 1896.

HIRAM STEVENS MAXIM.

Witnesses:
FRANK C. BAISLEY,
FRED C. HARRIS.